US 6,731,723 B1

(12) United States Patent
Garey

(10) Patent No.: US 6,731,723 B1
(45) Date of Patent: May 4, 2004

(54) MULTI-LINE RECORDING DEVICE HAVING REDUCED PROCESSING AND STORAGE REQUIREMENTS

(75) Inventor: Kenneth E. Garey, Irvine, CA (US)

(73) Assignee: Skyworks Solutions, Inc., Irvine, CA (US)

(*) Notice: Subject to any disclaimer, the term of this patent is extended or adjusted under 35 U.S.C. 154(b) by 0 days.

(21) Appl. No.: 09/163,263

(22) Filed: Sep. 29, 1998

(51) Int. Cl.[7] ................................................ H04M 1/64
(52) U.S. Cl. ..................... 379/88.1; 379/88.26; 704/503
(58) Field of Search .......................... 379/67.1, 38, 45, 379/88.13, 114.05, 199, 214.01, 88.1, 88.07, 93.08; 348/14.13; 704/503

(56) References Cited

U.S. PATENT DOCUMENTS

| | | | | |
|---|---|---|---|---|
| 4,355,207 A | * | 10/1982 | Curtin ..................... 379/214.01 |
| 5,195,126 A | * | 3/1993 | Carrier et al. ................. 379/45 |
| 5,333,173 A | * | 7/1994 | Seazholtz et al. ............. 379/38 |
| 5,524,138 A | * | 6/1996 | Kawano ..................... 379/88.28 |
| 5,570,414 A | * | 10/1996 | Stern ........................ 379/67.1 |
| 5,644,355 A | * | 7/1997 | Koz et al. ................. 379/93.17 |
| 5,805,671 A | * | 9/1998 | Ohuchi ................... 379/114.05 |
| 5,978,757 A | * | 11/1999 | Newton .................... 379/88.07 |
| 6,236,717 B1 | * | 5/2001 | Bremer et al. ........... 379/88.22 |
| 6,256,354 B1 | * | 7/2001 | Yoshida et al. ............. 375/219 |
| 6,314,124 B1 | * | 11/2001 | Infosino ..................... 375/211 |

* cited by examiner

Primary Examiner—Fan Tsang
Assistant Examiner—Gerald Gauthier
(74) Attorney, Agent, or Firm—Farjami & Farjami LLP

(57) ABSTRACT

An apparatus and method for recording at least two separate incoming signals which reduces computational complexity and memory requirements of the recording device. In one embodiment, the apparatus records and stores the first arriving signal using a high-compression algorithm to reduce memory requirements. Upon receipt of a second signal concurrent with the first arriving signal, the apparatus records and stores the second signal using a second compression algorithm with a lower compression ratio. The second algorithm requires less hardware or processor resources while still providing a moderate degree of compression in relation to the first algorithm. Upon completion of receipt of the first arriving signal, the second signal which was compressed using the second algorithm is decoded and then re-encoded using the first high-compression algorithm. This further reduces memory storage requirements without requiring additional hardware or processor capability. It is contemplated that one embodiment of the subject invention comprise a two line telephone answering machine.

24 Claims, 14 Drawing Sheets

MULTI-LINE RECORDING DEVICE HAVING REDUCED PROCESSING AND STORAGE REQUIREMENTS

BACKGROUND OF THE INVENTION

1. Field of the Invention

This invention relates generally to a multi-line recording device such as a telephone answering machine, and more specifically, to a recording device configured to concurrently record data from multiple sources.

2. Background

Modern communication systems often include means to detect and record incoming calls when the call recipient is not available to personally take the call. These types of devices, commonly known as answering machines, are generally considered to increase productivity and provide convenience. Modern answering machines also provide capability for remote dial-in by providing means for an operator to call the answering machine using a remote telephone and retrieve the stored messages.

Many new answering machines record messages digitally, that is, after converting the incoming voice signal into a digital signal. To reduce the amount of required memory, the digitized signal is compressed prior to storage in memory. A processor or other computing means performs the compression of the audio signal.

Furthermore, the increase in worldwide communications, telecommuting, teleconferencing, Internet access, and business operation from the home, has lead to an increase in the use of multiple telecommunication lines to a particular situs, such as the home or office. Multiple telecommunication lines increases productivity and adds convenience for individuals in need of multiple means of simultaneous or concurrent communication. Given the widespread use of answering devices and the growing popularity of two or more telephone lines, an answering device for two or more lines is desired.

Various attempts to provide automatic answering and remote call receipt via an answering device configured for two or more lines have been unsuccessful or plagued with undesirable attributes. One attempt comprised simply attaching a single line answering machine to each line. While this solution is clearly the most obvious, it is expensive due to the added cost of having to purchase two answering machines both of which include a power supply, control electronics, plastic housing, packaging, shipping and other costs associated with such a product. Furthermore, a party in receipt of messages on both answering machines must, if dialing in from a remote location, make two separate phone calls. Such a scenario is undesirable as it is time consuming and, should there be a need for a toll call, is generally twice as expensive.

Another proposed solution is a machine configured with a single recorder to accept and record a call from either line. However, this proposed solution, while less expensive then the previously discussed attempt, also has numerous drawbacks. For example, such a system is able to only record one call at a time. Thus, in a scenario in which two parties are calling at the same time, only the first arriving call can be recorded. The second but overlapping call does not have access to the answering machine. This proposed solution is obviously undesirable as it only allows one call to be recorded at a time. A further disadvantage of this proposed solution is that during the time the call recipient is remotely checking his messages, the automatic answering device is occupied in playback mode and hence unavailable to record an incoming call on either line. Similarly, if a caller is recording a message, the answering machine is not available to provide remote message retrieval.

The previously discussed need for an audio recording device for multiple telephone lines is likewise applicable to applications beyond audio data. For example, a similar need may arise in relation to automatic call answering and recording capability for video telephones. Video telephones not only provide audible information, but also a real time video image of the calling party.

Another area in which a need for such a device may arise is in relation to automatic video and/or audio recording devices, such as, for example, electronic surveillance devices and security video cameras. It is desirable to be able to record multiple streams of data from security cameras, both independently and simultaneously, using a system with minimal cost and complexity.

Accordingly, one object of the subject invention is to provide a method and apparatus for automatic signal acceptance and recording of data from multiple lines during times when data is being received over one or more of the lines simultaneously or concurrently.

A further object of the subject invention is to a provide a method and apparatus for providing remote signal retrieval capability while maintaining incoming signal recording capability.

Yet another object of the subject invention is provide a method and apparatus for recording multiple incoming data streams simultaneously or concurrently while avoiding undue increases in cost and complexity.

Yet another object of the subject invention is to reduce the memory and processing requirements of a multiple line telephone answering machine while still providing a capability for simultaneously or concurrently answering and recording multiple incoming calls.

Yet another object of the subject invention is provide a multiple line automatic answering machine capable of recording multiple incoming calls from a video phone.

A further object of the subject invention is to overcome the disadvantages of the prior art.

Further objects of the subject invention include utilization or achievement of the foregoing objects, alone or in combination. Additional objects and advantages will be set forth in description which follows, or will be apparent to those of ordinary skill in the art who practice the invention.

SUMMARY OF THE INVENTION

The subject invention provides a recording device and related method of operation for receiving and recording two or more simultaneously or concurrently arriving data inputs, in the form of audio signals, and the like, while minimizing the memory and processor requirements of the device. Minimizing these aspects advantageously reduces the cost and complexity of the recording device. In one embodiment, the invention comprises a dual line telephone answering device having capability to receive and simultaneously or concurrently record two incoming calls. Included in the answering device are one or more multiplexers configured to route the incoming signal to a selected one of a plurality of encoders. Each of plurality of the encoders performs signal compression on an incoming signal to reduce the amount of memory required for storage of the signal.

The multiplexers are configured to route the first arriving message to an encoder configured to encode the signal using a high-compression algorithm. A high compression of algorithm is advantageous since it requires only moderate computational resources while achieving significant compression ratios. A second signal, should it arrive concurrently with or during receipt of the first message, is routed to an encoder configured to encode the signal using a low-compression algorithm. This type of algorithm has the advantage of requiring only minimal computational resources and cost while achieving moderate compression ratios. After encoding, a memory manager stores the compressed signal in a memory.

Also included are means to detect the completion of the first incoming message, and a decoder capable of decompressing the second arriving message in preparation for re-encoding it by the high-compression encoder. Such a means allows reallocation of resources once encoding of the first arriving message has been completed, and redeployment of these resources to increase the compression ratio of the second arriving message. This desirably reduces the memory requirements of the answering device by reducing the amount of memory required to store the second arriving message without increasing the complexity of the processing circuitry.

The principles of the subject invention are equally applicable to a recording device for a video phone, in which the incoming signal comprises a video and audio feed. In this case, the memory storage requirements are even more significant because of the volume of data needed to represent a video image. Hence, the reduction in processing requirements and memory storage requirements available through incorporation of the subject invention, becomes even more significant.

It is contemplated that the subject invention will find application in various applications and environments other than answering machines and video phones. One such application comprises a recording device in a motion, voice, or sound activated surveillance system in which it is desired to record two or more data feeds simultaneously.

DETAILED DESCRIPTION OF THE PREFERRED EMBODIMENTS

| Table of Contents | |
|---|---|
| Page | Section |
| 6 | Introduction |
| 7 | Example Environment |
| 9 | First Example Embodiment |
| 11 | Exemplary Realization of First Example Embodiment |
| 17 | Operation of Exemplary Realization of First Example Embodiment |
| 17 | Single Incoming Call |
| 19 | Outgoing Message |
| 20 | Two Concurrently Arriving Messages |
| 22 | Message Playback |
| 23 | Second Example Embodiment |
| 25 | Third Example Embodiment |
| 26 | Fourth Example Embodiment |
| 27 | Fifth Example Embodiment |
| 28 | Additional Features and Variations |

Introduction

The subject invention comprises a method and apparatus for simultaneously recording and storing two or more simultaneously or concurrently arriving signals. The recording device includes one or more encoders configured to receive and store one or more incoming signals. One or more encoders compress the incoming signals depending on design and operating preferences. To reduce the amount of system memory and processing complexity, the subject invention may be configured to perform high compression ratio encoding on the first arriving signals and low compression encoding on later but concurrently arriving signals. Alternatively, low compression encoding or no encoding may occur during receipt of all arriving signals and high-compression encoding deferred until completion of all incoming signals. In this manner, the amount of memory is reduced due the eventual high-compression encoding of all signals. Further, the processing complexity of the recording device is minimized by avoiding simultaneous high-compression encoding of two signals.

Example Environment

Before describing the invention in detail, it is useful to describe an example environment in which the invention can be implemented. One such example environment is a multiple line answering machine, such as for use in combination with a two line telephone. However, this is in no way intended to limit the scope of the claims of the subject invention. A recording device for two or more simultaneously arriving signals has many applications beyond that of a two-line answering machine.

Figure 1:
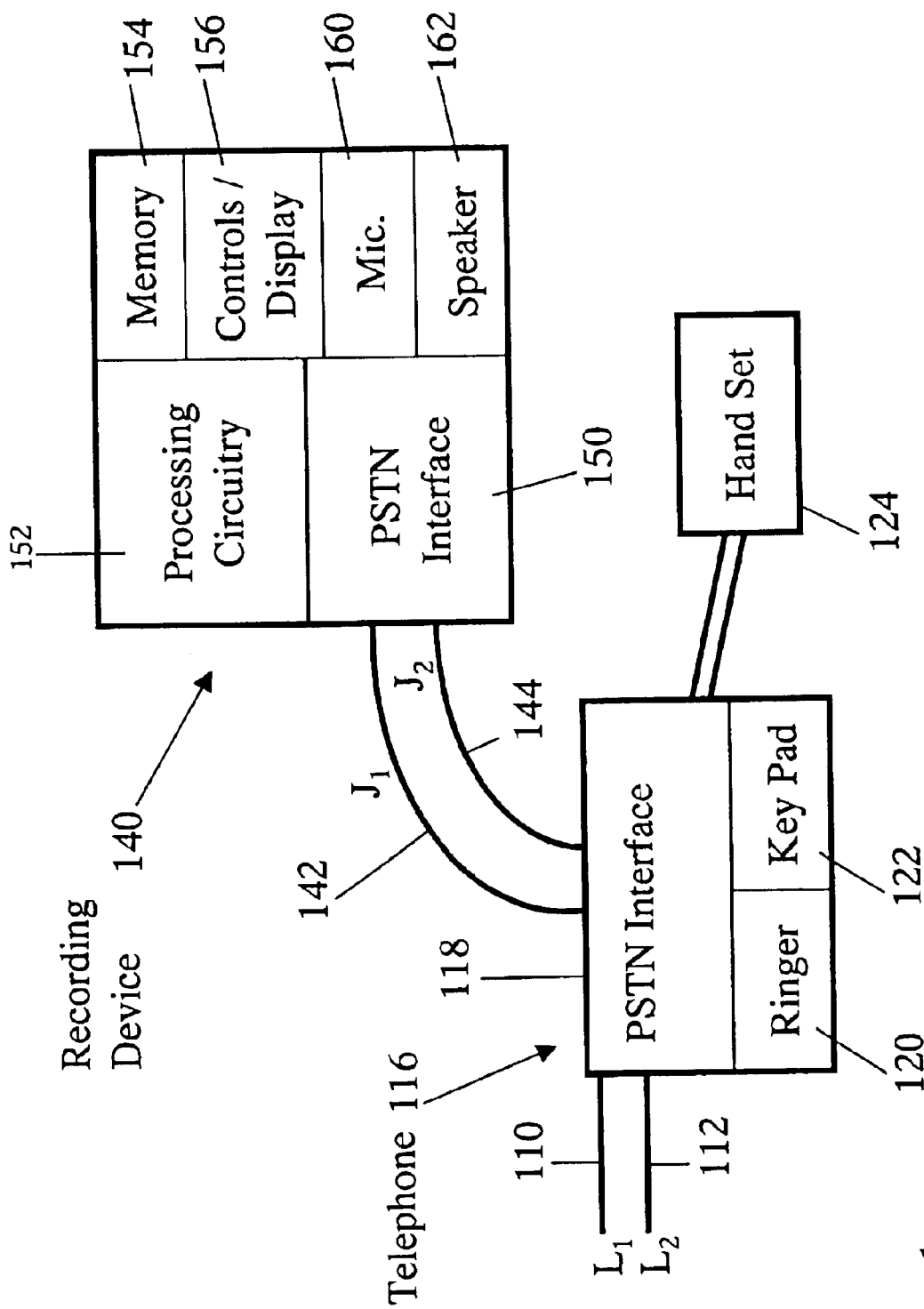
FIG. 1 is a block diagram of a two line telephone and two line automatic answering device.

FIG. 1 illustrates a block diagram of a telephone 116 coupled to a recording device 140. The telephone 116 and recording device 140 work in unison to record and store incoming calls arriving over either line1 110 or line2 112. In particular, both of line1 110 and line2 112 connect to the telephone 116. The incoming lines 110, 112 enter a public switch telephone network (PSTN) interface 118 in the telephone. The PSTN interface 118 connects to a ringer 120 and a keypad 122 and other telephone control circuitry (not shown). Also connecting to the telephone 116 is a handset 124 which contains both microphone means and speaker means for audible communication.

The telephone 116 connects to the answering machine 140 via a first jumper line 142 and a second jumper line 144. Both of the jumper lines 142, 144 connect to an answering device PSTN interface 150. The answering device PSTN interface 150 behaves generally as the PSTN interface 118 in the telephone 116. As known by those of ordinary skill in the art, PSTN is the telephone network over which the majority of calls in the United States are presently made, and it defines a standard for interfacing communication components. Advantageously, the PSTN interfaces 118 and 150 conform to this standard. In general, PSTN interfaces serve as an interface between the Public Switched Telephone Network and a particular electronic device, in this case a telephone and an answering device. The PSTN interface includes, among other features, ring detection, an isolation barrier between the PSTN lines and the electronic device, and off-hook detection. PSTN interfaces are commonly used to connect faxes machines, modems, and answering machines to the PSTN.

Also integral with the answering device 140 is processing circuitry 152, which is electrically coupled to memory 154, user interface and display means 156, a microphone 160, and a speaker 162. The processing circuitry 152 is discussed below in greater detail in conjunction with FIGS. 2–7. In short, the processing circuitry 152 oversees operation of the recording device 140 and serves to coordinate operation of the memory 154, which digitally stores messages, the interface and display means 156, which provides an interface to the user, and the microphone 160 and speaker 162.

In operation, the combination of the telephone 116 and answering machine 140 monitors both of line1 110 and line2 112, and upon receipt of an incoming call, the PSTN interface 118 sounds the ringer 120.

If the call is not answered at the telephone 116, the recording device PSTN interface 150 answers the call. The PSTN interface 150 appropriately conditions the call for communication with the processing circuitry 152. Upon receipt of a call from the PSTN interface 150, the processing circuitry 152 audibly transmits a greeting and a tone (beep) to the caller prompting the caller to leave a message. The processing circuitry 152 preferably compresses the incoming call and stores the compressed data in the memory 154. As discussed in greater detail below, the subject invention is capable of recording two calls simultaneously such that it simultaneously processes, compresses, and stores two overlapping incoming calls.

To retrieve the stored messages, the message recipient uses the user controls and display means 156 to activate the processing circuitry 152 to audibly play the message over the speaker 162. Alternatively, the message retriever may record a different voice prompt using the microphone 160.

The invention is described herein in terms of a example telephone answering machine. Description in these terms is provided for ease of discussion only. After reading the description herein, it should be apparent to one of ordinary skill in the art that the present invention can be implemented in any of a number of ways in a number of different environments.

First Example Embodiment

Figure 2:
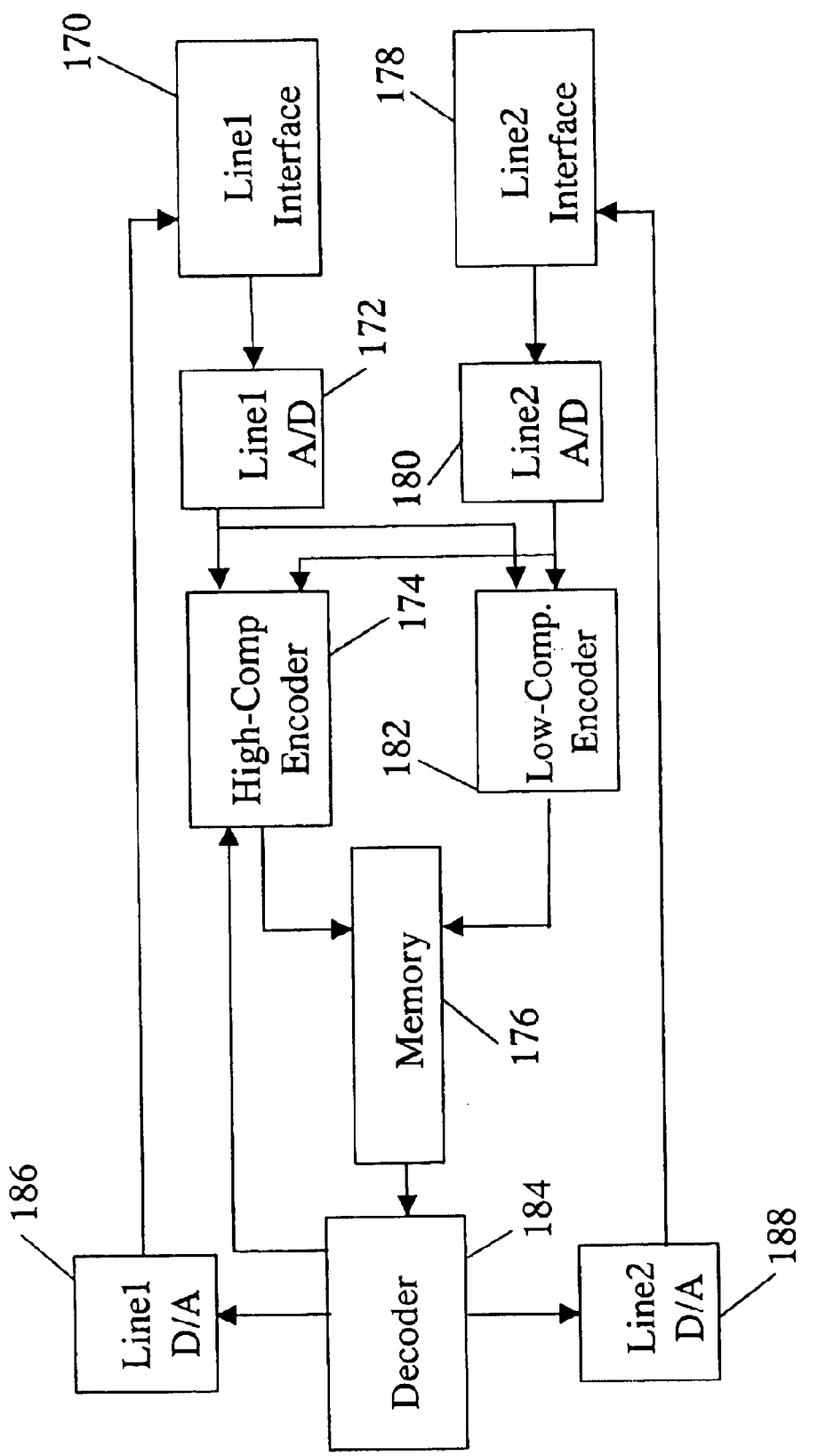
FIG. 2 is a block diagram of a first example embodiment of the subject invention.

A first example embodiment of the subject invention, suitable for use in recording two concurrently arriving signals, is illustrated in basic block diagram form in FIG. 2. Included in the first example embodiment is a line1 interface 170 having output connected to a line1 analog to digital (A/D) converter 172. The line1 A/D 172 connects to a high-compression encoder 174 and a low-compression encoder 182. The high-compression encoder 174 and low-compression encoder 182 both connect to memory 176.

The first example embodiment also includes a line2 interface 178 having output connected to a line2 A/D converter 180. The line2 A/D converter connects to the low-compression encoder 182 and the high-compression encoder 174. Both encoders 174, 182 connect to the memory 176.

The output of the memory 176 connects to a decoder 184. The decoder has outputs connecting to the high-compression encoder 174, a line1 digital to analog (D/A) converter 186 and a line2 D/A converter 188. The output of the line1 D/A converter 186 and the output of the line2 D/A converter 188 connect to the line1 interface 170 and line2 interface 178 respectively.

Also included is a controller (not shown) for coordinating the activities of the components illustrated in FIG. 2. In one exemplary embodiment, the controller is one or more processors, such as microprocessors, digital signal processors (DSP) or the like.

Figure 3:
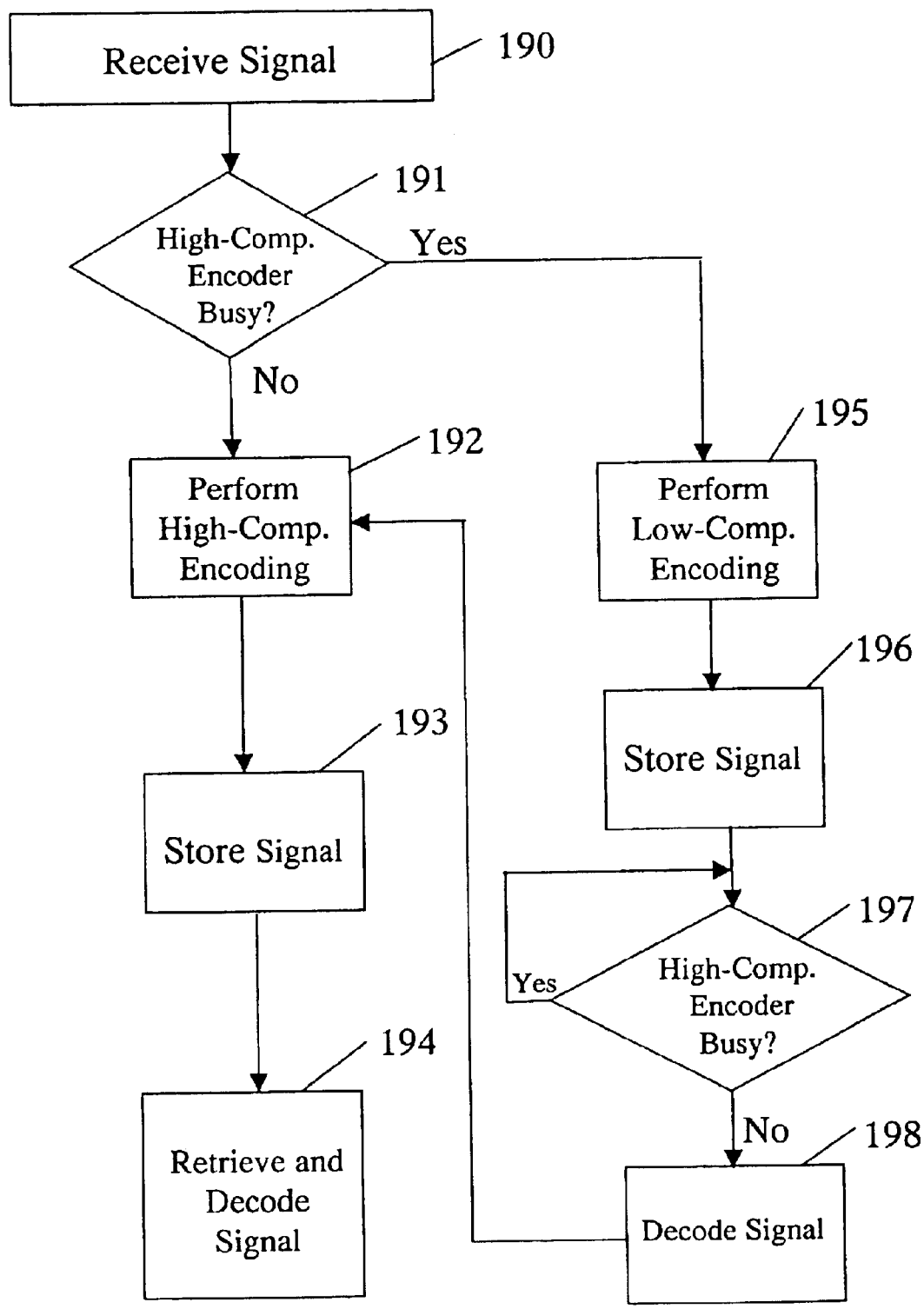
FIG. 3 illustrates a method in accordance with the first example embodiment.

The operation of the first example embodiment is described below in conjunction with FIG. 3. As shown in FIG. 3, at step 190 the system receives an incoming signal at either of the line1 interface 170 or the line2 interface 178 and converts this incoming signal to a digital format. At decision step 191, the system determines if the high-compression encoder 174 is encoding an incoming signal. If the high-compression encoder is encoding an incoming signal, then is does not have the ability to concurrently encode the next incoming signal.

If the high-compression encoder 174 is not encoding an incoming signal, the signal passes to the high-compression encoder for high-compression encoding, step 192. Thereafter, at step 193, the system stores the encoded signal in memory 176. To obtain the stored signal, an operator or other control means retrieves and the stored signal from memory 176 and using the decoder 184, decodes the signal, step 194. The signal is optionally presented to either the line1 interface 170 or the line2 interface 178 through the appropriate D/A 186, 188.

Referring back to step 191, if the high-compression encoder 174 is receiving an incoming signal, then the decision step 191 proceeds to step 195 wherein the signal is routed to the low-compression encoder 182 for low-compression encoding, step 195. At a step 196, the system stores the signal in memory 176.

At decision step 197, the high-compression encoder is polled to determine if it is still encoding an incoming signal. If the high-compression encoder is not encoding, the decoder 184 decodes the low-compressed signal, step 198, and forwards it to the high compression encoder 174. The process then continue as described above in steps 192, 193, and 194, and, in particular, performs high-compression encoding on the signal and stores the signal for later retrieval and decoding.

It is further contemplated that additional interfaces, A/D converters, and low-compression encoding may be integrated with the circuit without departing from the scope of the invention.

The above described embodiment has the advantage of reducing the amount of memory required to store one or more store signals because each signal is eventually subject to high-compression encoding without the need for two high-compression encoders 174. A further advantage is that the computational resources, i.e. the required computing capacity, of the encoders is minimized because the more complex high-compression operation does not need to be simultaneously performed on two concurrently arriving signals. Additional advantages and details of the first example embodiment are evident from the following description of one exemplary realization of the first example embodiment.

Exemplary Realization of the First Example Embodiment

Figure 4:
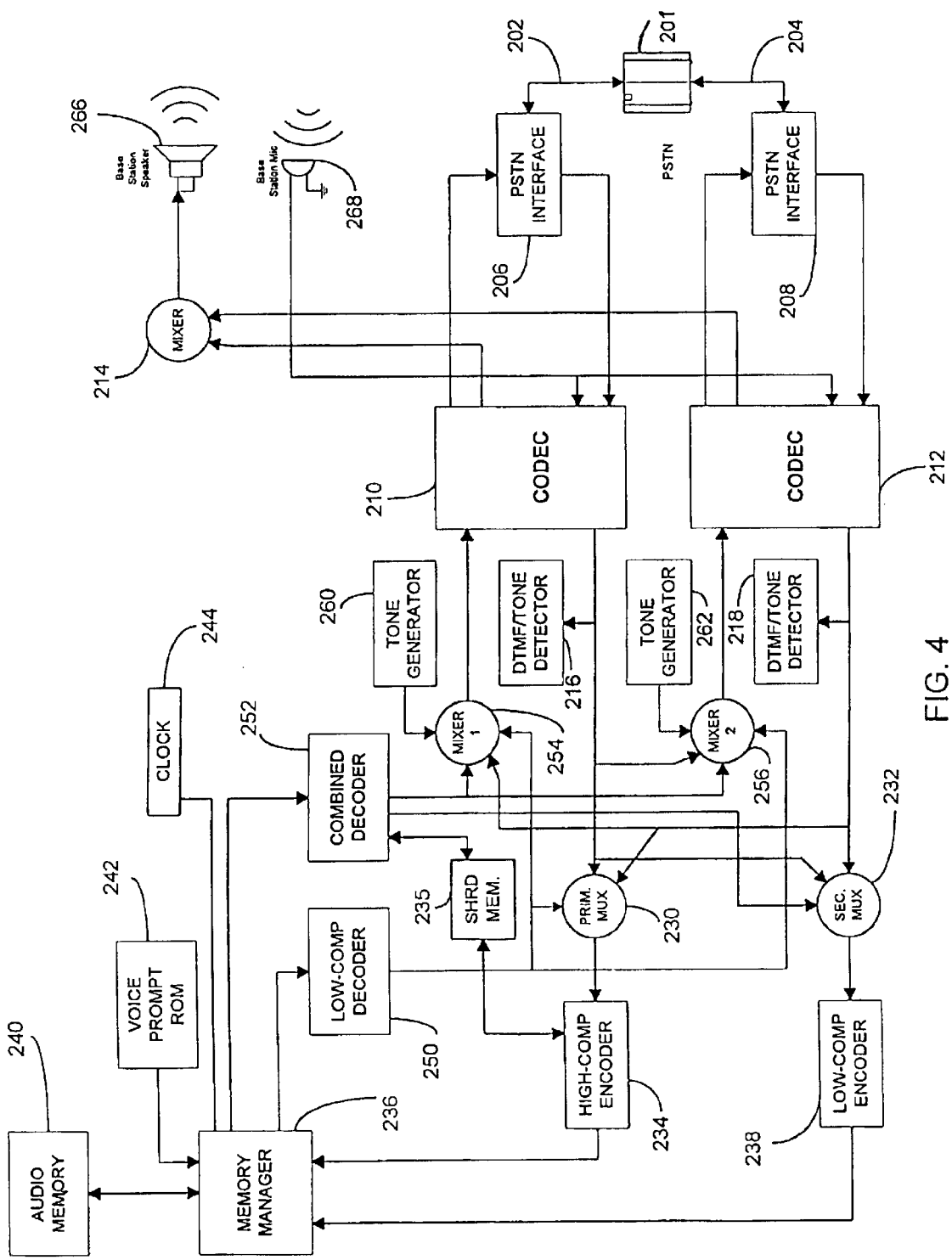
FIG. 4 illustrates an exemplary realization of the first example embodiment.

FIG. 4 provides a block diagram of circuitry that can be used to implement the first example embodiment of a data recorder of the subject invention. As shown, the data recorder in this realization includes a first data port 202 and a second data port 204. The first data port 202 connects to a first PSTN interface 206 and the second data port 204 connects to a second PSTN interface 208. It is contemplated that each data ports 202, 206 connect to individual data lines, both of which connect to the public switch telephone network (PSTN) 201, as is common in the U.S.

The first PSTN interface 206 couples via a two-line connection to a first Coder/Decoder (CODEC) 210 while the second PSTN interface 206 connects to a second Coder/Decoder (CODEC) 212. Each CODEC 210, 212 has at least three outputs. The first connects to a speaker mixer 214. The second output feeds back into either of PSTN interfaces 206, 208. The third output connects to a line1 DTMF/tone detector 216 or a line2 DTMF tone detector 218 (depending on the line), and a primary multiplexer 230 and a secondary multiplexer 232. With regard to the connection to the multiplexers 230, 232, each of the first CODEC 210 and second CODEC 212 connects to the primary multiplexer 230 and the secondary multiplexer 232.

The output of the primary multiplexer 230 couples to a high-compression encoder 234. The output of the high-compression encoder 234 is in communication with a memory manager module 236. The high-compression encoder also connects to a shared memory 235.

The secondary multiplexer 232 connects to a low-compression encoder 238 which, in turn, has an output in communication with the memory manager module 236.

The memory manager module 236 is in communication with some form of memory 240. The memory manager module 236 is also in communication with a voice prompt ROM 242 and a date/time clock 244. The memory manager module 236 connects via a first output to a low-compression decoder 250 and via a second output to a combined decoder 252. The combined decoder is capable of decoding signals encoded by the high-compression encoder 234, or signals encoded by the low-compression encoder 238. The combined decoder 252 connects to the shared memory 235, a line1 mixer 254, a line2 mixer 256, and the secondary multiplexer 232. The output of the low-compression decoder 250 connects to the primary multiplexer 230 and the line1 mixer 254 and the line2 mixer 256.

The line1 mixer 254 also obtains input from a line1 tone generator 260 while the line2 mixer 256 obtains input from a line2 tone generator 262. The output of the line1 mixer 254 feeds into one of the inputs into the line1 CODEC 210. The output of the line2 mixer 256 feeds into the input of the line2 CODEC 212.

The output of the line1 CODEC 210 and the line2 CODEC 212 feed into the speaker mixer 214. The speaker mixer 214 connects to a speaker 266. Each of the line1 CODEC 210 and line2 CODEC 212 also connect to a microphone 268. The second output of each CODEC 210, 212 connects to a PSTN interface 206, 208 which, in turn, connects to the public switch telephone network 201.

In this realization of the first example embodiment, operations depicted in FIG. 4 as occurring in components to the right of the CODECs 210, 212 occur in the analog domain, whereas, due to the advantages of operation in the digital domain, operations depicted in FIG. 4 as occurring in the components to the left of these CODECs advantageously occur in the digital domain. Also included in the example implementation of FIG. 4, although not shown, is various controller circuitry, such as microprocessor or DSP devices, to control the operation of the primary components previously described.

The operation of the overall system of the first example embodiment is discussed in greater detail below in conjunction with FIG. 5–7. However, for purposes of explanation, the individual operation of the various components of the exemplary realization of FIG. 4 follows.

The public switch telephone network (PSTN) serves as the nation's telephone network and provides the standard communications and interface protocol to ensure compatibility between devices. The line1 PSTN interface 206 and the line2 PSTN interface 208 connect to the PSTN.

The line1 CODEC 210 and line2 CODEC 212 convert analog signals to digital signals and digital signals into analog signals. Each of the CODECs 210, 212, comprise a combined analog to digital converter, digital to analog converter, and switching circuitry, all advantageously contained on a single chip. A CODEC is commonly found in modems and other communication devices, and need not be explained further. After exiting either of CODECs 210, 212, an incoming signal received from one of the PSTN interfaces 206, 208 is presented to the primary multiplexer 230 and the secondary multiplexer 232. Multiplexers are known by those of ordinary skill in the art. In this embodiment, they serve as a switch to route data as appropriate to either of the encoders 234, 238. In one embodiment (not shown), the switching and/or muliplexing performed by multiplexers 230, 232 is contained within the encoders 234, 238.

The high-compression encoder 234 comprises encoding means capable of performing high-compression encoding on the incoming signal. Performing high-compression encoding desirably reduces the amount of memory required to store the voice message. In one variation, the high compression encoder 234 comprises a configuration of hardwired circuitry configured to achieve high rates of signal compression. In another variation, the high-compression encoder comprises a compilation of software code configured to run on a general purpose microprocessor. In yet another variation, the compilation of software code operates in conjunction with a digital signal processor (DSP). If the high-compression encoder is embodied as a processor or DSP, it utilizes the shared memory 235 as a short-term or scratch-pad memory during the computation process. The shared memory 235 is also utilized by the combined decoder 252 during the high-compression decoding process. In another variation, in which the encoders and decoders are embodied using hardware, a number of registers (not shown) function as shared memory.

The encoding scheme utilized by the high-compression encoder 234 depends on the hardware configuration or available processing power of the processor or DSP. It is contemplated that any of a number of common speech compression algorithms that perform high-compression and utilize from 5 to 40 million processor instructions per second (MIPS) to achieve generally a 40:1 compression ratio are possible. In one variation, the high-compression algorithm utilized to encode the incoming signal comprises an Enhanced Full Rate GSM Encoder that operates at generally 13 kilobits/second. In another variation, the high-compression algorithm utilized to encode the incoming signal comprises an Enhanced Half Rate GSM Encoder that operates at generally 7 kilobits/second. In yet another variation, the recording device selects a compression algorithm based on the availability of processing resources and the type of data being stored.

The low-compression encoder 238 is enabled in a fashion similar to the high-compression encoder 234, but with an encoding scheme that either costs less to construct or places fewer processing demands on each processor or DSP. To achieve such reduced processing rate, it is contemplated that the low-compression encoder 238 achieve a lower rate of compression of the incoming signal. In one variation, the low-compression encoder comprises an encoder capable of performing Adaptive Differential Pulse Code Modulation (ADPCM), a coding compression scheme requiring relatively few processing resources and providing a general 4-to-1 compression ratio. ADPCM operates to form an error signal as the difference between successive input speech samples and a corresponding prediction estimate which is quantified and transmitted. ADPCM uses the prediction estimate to determine the incoming input samples using previously decoded samples. It is contemplated that encoding schemes other than ADPCM may be used.

As known by those familiar with signal coding, there exists a trade-off between processor power and processor cost. In general, the more powerful a processor or processing hardware, the greater the cost. Thus, it is preferred to have no more processing hardware or capability than is required. However, another factor is the amount of memory and the cost of additional memory. More complex or powerful processor hardware is better able to achieve higher compression ratios than less powerful processors. Thus, a more expensive processor can compress a signal at a higher ratio and thus reduce the amount and cost of required memory. Using these design parameters, and the required processing capability, the recording device is ideally configured.

The output of both of the encoders 234, 238 flows to the memory manager module 236. The memory manager module 236 regulates and acts as a conduit for information flow to and from the memory 240. Memory manager modules 236 are known by those of ordinary skill in the art and are commonly found in computing systems having data transmitted between, and stored in, some form of electronic memory.

The memory 240 comprises an electronic memory, preferably in the form of RAM (Random Access Memory). Alternatively, the memory 240 comprises a hard drive, tape drive, or other permanent or volatile memory means. Likewise, the voice prompt is stored on ROM 242 (read-only memory) configured to store a standard voice prompt. It is contemplated that in one variation the voice prompt is stored in the voice prompt ROM 242 in a highly compressed state and at power-up of the machine the memory manager module 236 sends the voice prompt to the high-compression decoder 252. The high-compression decoder 252, which utilizes the shared memory 235, forwards the decompressed voice prompt to the secondary multiplexer 232 and on to the low-compression encoder 238. Once the low-compression signal is encoded, it is stored in memory. Storing the voice prompt in a low-compression state eliminates the need to use the combined decoder 252 during message playback. This advantageously frees the resources of the shared memory 235 for use by the high-compression encoder during incoming message encoding. In another variation, the voice prompt is stored in DRAM memory with battery backup (not shown). In yet another variation the voice prompt is stored in a flash memory module (not shown).

Connected to the output of the memory manager module 236 is a low-compression decoder 250 configured to reverse the effects of the low-compression encoding. Preferably, this decoder 250, in combination with the low-compression encoder 238, introduces minimal signal distortion and data loss. The combined decoder 250, also connected to the memory manager module 236, is capable of reversing the effects of either the high-compression encoder 234, or the low-compression encoder 238.

The output of the combined decoder 252 connects to the line1 mixer 254 and line2 mixer 256. Each mixer 254, 256 is a device having two or more inputs configured to combine one or more separate input signals in desired proportion to produce an output signal. In one variation, the mixers 254, 256 combine the signals by providing varying amounts of gain to each of the inputs or zero gain to negate the effect of one input entirely.

The line1 tone generator 260 and line2 tone generator 262, as shown, generate a tone or, as is commonly referred to, a beep, which prompts the caller to begin leaving their message. This tone is preferably superimposed over the outgoing voice prompt. Upon exiting the mixers 254, 256, the signal enters one of the CODECs 210, 212 (previously discussed). The output of the CODECs 210, 212 enters the speaker mixer 214, which, as with the line1 and line2 mixers 254, 256, is configured to provide varying amounts of gain to either of the entering signals. The speaker 266, known by those of ordinary skill in the art, connects to the speaker mixer 214. Finally, the microphone 268 connects to the line1 CODEC 210 and line2 CODEC 212 to provide means for recording a message different from the standardized message stored on the voice prompt ROM 242.

Each DTMF (Dual Tone Multi-Frequency) tone detector 216, 218 is situated to monitor tones arriving from a message recipient calling in to retrieve their messages from a remote location via a telephone. DTMF tones comprise combinations of high and low frequency sine waves and identify each of the various numbers, i.e. buttons, on the phone. Each DTMF tone detector 216, 218 is situated to monitor tones arriving from a message recipient calling in to retrieve their messages from a remote location via a telephone. Hence, a message recipient wishing to check their messages would call the answering device and enter a code using the telephone keypad to generate DTMF tones. The DTMF tone detector 216, 218 monitors the incoming signal for the appropriate code and, upon the receipt of such code, interfaces with the other circuitry of the answering device to allow the caller to selectively listen to, erase, or perform other functions of the answering device from a remote location.

Operation of the Exemplary Realization of the First Example Embodiment

Figure 5A:
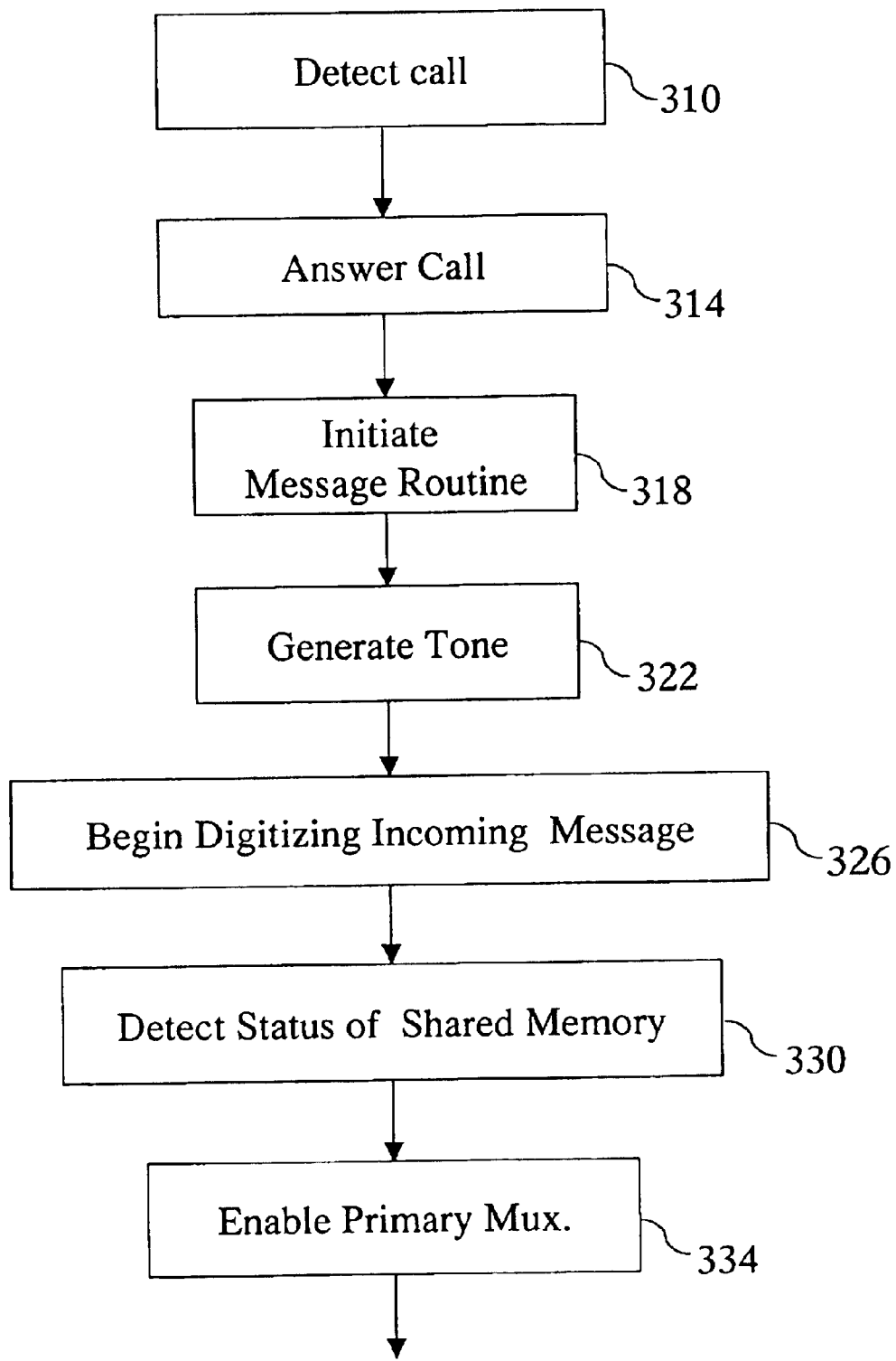
FIGS. 5A–5B illustrates a method of operation when processing a single data input in accordance with a realization of the first example embodiment.
Figure 5B:
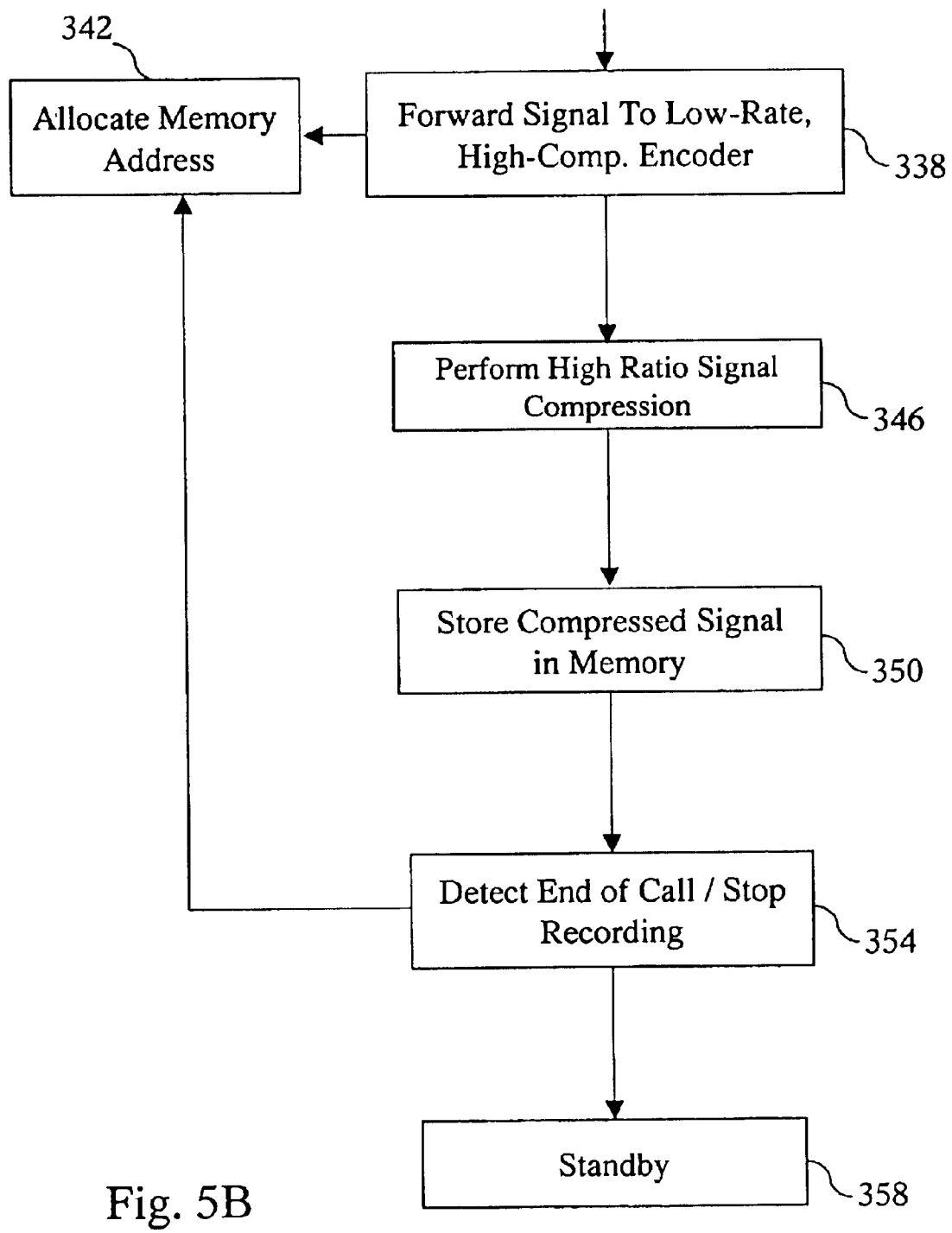
Figure 6:
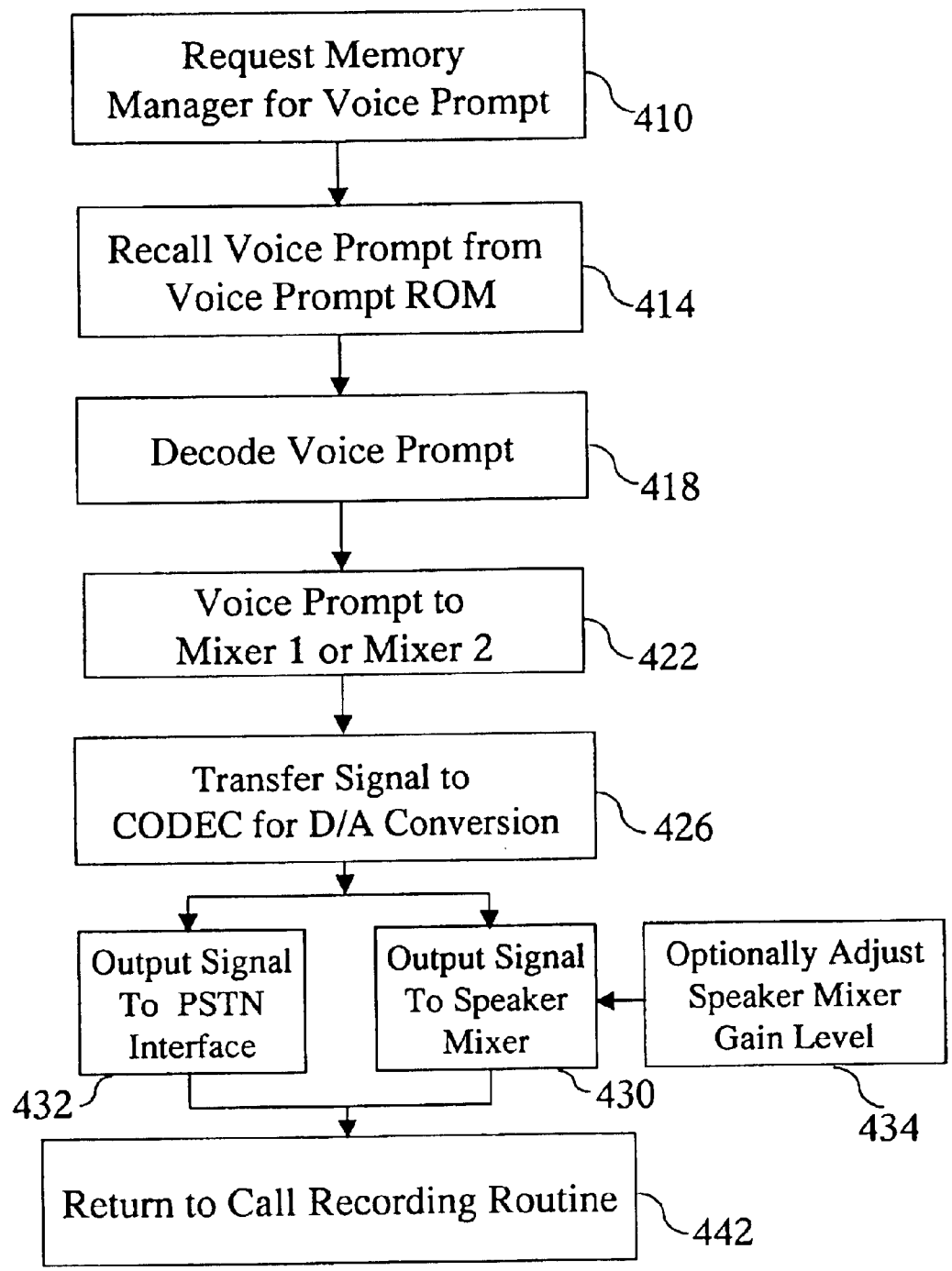
FIG. 6 illustrates a method of operation when recalling a voice prompt in accordance with a realization of the first example embodiment.

FIGS. 5–7 illustrate a flow diagram of an operation of a realization of the first example embodiment of the subject invention.

Single Incoming Call

FIGS. 5A–5B illustrate operation of the answering and recording device of the first example embodiment when receiving a single call over either the line1 202 or the line2 204. In reference to FIG. 5A, at step 310, either of the line 1 PSTN interface 206 or the second line 2 PSTN interface 208 detects an incoming call. For ease of discussion, it is assumed the call arrives on line1. At step 314, if the call recipient has not answered the call after a user-definable and determined number of rings, the answering device answers the call.

Accordingly, at step 318, the processing circuitry of the answering device initiates the message routine. The message routine of step 318 is discussed in detail in conjunction with FIG. 6.

Upon completion of the message routine step 318, in one embodiment, the tone generator 260 superimposes the tone on the outgoing signal. As is commonly known, the tone prompts the caller to begin leaving a message.

In step 326, according to the exemplary realization, the incoming message is digitized. The line1 CODEC 210 converts the signal to a digital format. In step 330, the system queries the status of the primary multiplexer 230 to ascertain whether the high-compression encoder is currently occupied with an incoming message. In one variation, a flag or register indicates the status of the high-compression encoder 234 or primary multiplexer 230. In another variation, the voltage level of a chip pin designates the status of the high-compression encoder 234 or primary multiplexer 230. Because this example concerns a single incoming call, the primary multiplexer 230 is assumed idle. A scenario in which the primary multiplexer 230 is occupied with an incoming message when a second incoming call arrives is discussed in detail in conjunction with FIGS. 7A–7B.

In step 334, upon detection of the idle condition of the shared memory 235, the system enables throughput through the primary multiplexer 230 and disables throughput through the secondary multiplexer 232. Moving now to FIG. 5B, at step 338, the enabled primary multiplexer 230 allows the incoming message to pass to the high-compression encoder 234. The high-compression encoder 234 in conjunction with the memory manager module 236 and shared memory 235 performs two functions. First, in step 342, a memory address is allocated to store the incoming message. Second, at step 346, the signal is subject to a high ratio compression algorithm. At step 350, the system stores the compressed message in memory 240.

At step 354, the end of the message or call occurs and the recording ceases. In step 342, the memory manager 236 notes the memory address at which the message ends.

Thereafter, at step 358, the recording device enters standby mode and awaits another incoming call on either line1 or line2.

Although not shown, throughout the voice prompt, the DTMF/Tone Detector 216 monitors line1 and line2 for DTMF tones that comprise a pre-programmed or user definable code directing the answering device to enter a remote controlable mode thereby allowing for remote message playback over the PSTN.

The above described operation of the first example embodiment progresses in the described manner whether the call arrives over line1 or line2. Hence, both CODEC 210 (for line1) and CODEC 212 (for line2) provide its output to both the primary multiplexer 230 and the secondary multiplexer 232. Processing circuitry detects the presence of an incoming message and the status of the primary multiplexer 232. A situation in which two calls overlap is discussed in greater detail in conjunction with FIGS. 7A–7B.

Outgoing Message

FIG. 6 provides a flow diagram illustrating a method of operation of the first example embodiment in relation to an outgoing message. This method is referenced generally at step 318 in FIG. 5A.

With reference to FIG. 6, the first step of the outgoing message routine, step 410, comprises a request to the memory manager 236 for the outgoing voice prompt data. At step 414, the memory manager 236 recalls the voice prompt from ROM 242. In one variation, (described in more detail above) the voice prompt is stored using low-compression ADPCM encoding to eliminate the need for a second high-compression encoder, and to avoid additional competition for the resources of the shared memory 235 between the high-compression encoder 234 and combined decoder 252.

At step 418, the low-compression decoder 250 decodes the voice prompt, which is generally compressed to reduce memory storage requirements, and, at step 422, either of the line1 mixer 254 or line2 mixer 256 is enabled to allow the voice prompt to pass to either of CODECs 210, 212, respectively. For example, when a call arrives over line1, the system enables the line1 mixer 254, whereas if the call arrives over line2, the system enables the line2 mixer 256.

At step 426, CODECs 210, 212 convert the outgoing signal to an analog equivalent and, at step 430, the speaker mixer 214 receives the outgoing message. Optionally, at step 434, the gain of the speaker mixer 214 is adjusted to play the outgoing message over the speaker 266 of the answering device. Simultaneously, at step 432, the system provides the outgoing message to the appropriate PSTN interface 206, 208 for receipt by the calling party.

Upon completion of the voice prompt, the process returns to the steps described in conjunction with FIGS. 5A–5B, and, in particular, step 322, wherein a tone is generated to prompt the caller to begin leaving their message. At step 422, a return to the call recording routine of FIGS. 5A–5B is made, indicating the end of the outgoing message routine.

Two Concurrently Arriving Messages

Figure 7A:
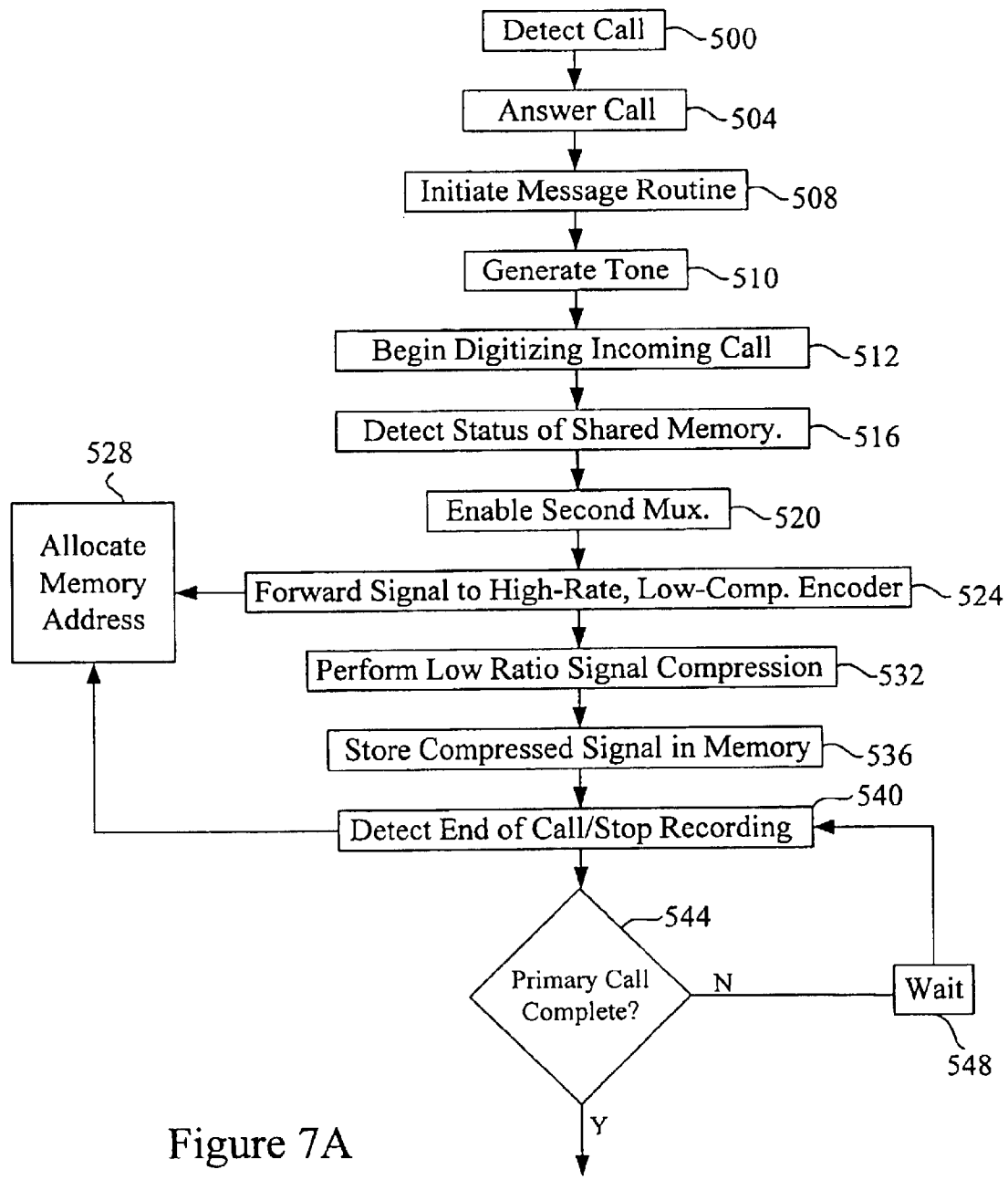
FIGS. 7A–7B illustrates a method of operation when processing simultaneous data inputs in accordance with a realization of the first example embodiment.
Figure 7B:
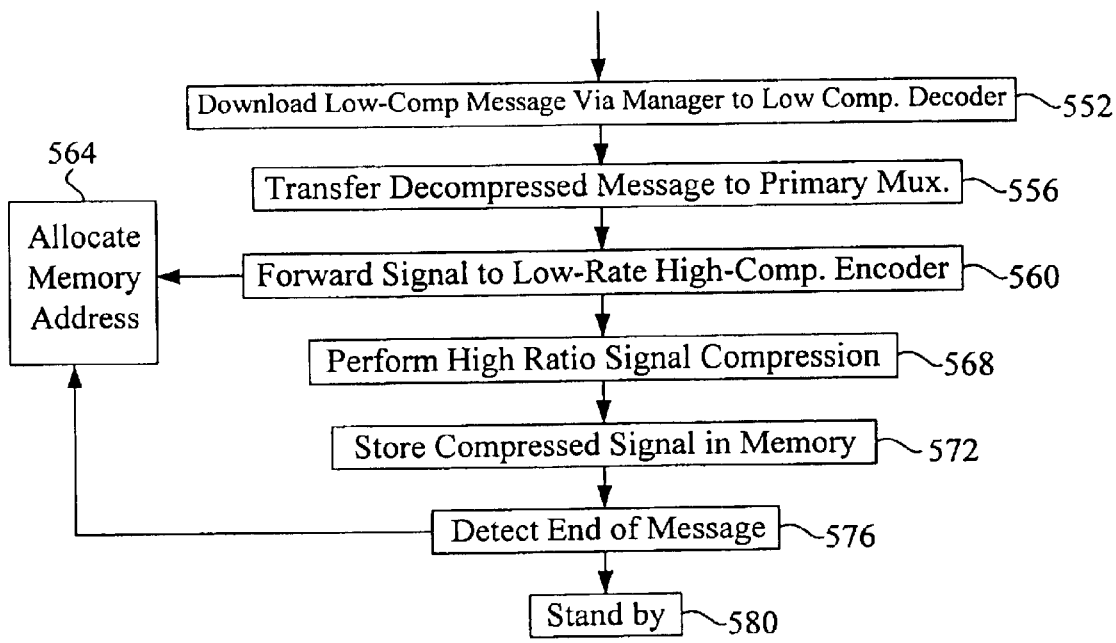

FIGS. 7A–7B illustrate a flow diagram of a method of operation of the first example embodiment of the subject invention in the scenario in which a second call is received during receipt of a first call. Because this process illustrates a scenario such as that depicted in FIGS. 5A–5B, in which a first call is already being recorded at the time of receipt of the second call, only the acceptance and recording of the second call is detailed in the method steps of FIGS. 7A–7B.

At step 500, the idle PSTN interface 206, 208 of the idle line, either line1 or line2, detects an incoming call. In a step 504, after the appropriate number of rings have occurred without the call being answered at the telephone, the recording device accepts the call. Subsequently, at step 508, the system initiates the outgoing message routine illustrated in FIG. 6. At step 510, upon completion of the message routine, the appropriate tone generator 260, 262 creates a beep. The tone prompts the caller to begin leaving a message.

At step 512, the incoming message is provided to either of the CODECs 210, 212 not occupied with the other call. As the incoming call is being digitized, the process moves to step 516, wherein the system evaluates the status of the shared memory 235. In this example, the primary multiplexer 230 and shared memory 235 are occupied with the first arriving incoming call. Accordingly, at step 520, the recording device enables the secondary multiplexer 232.

At step 524, the secondary multiplexer 232 forwards the signal to the low-compression encoder 238. At step 528, the output of this encoder 238 causes the memory manager 236 to allocate a memory address to store the second incoming message.

At step 532, low-compression encoding occurs on the incoming message to reduce the memory space required for storage. In one variation, the compression algorithm comprises adaptive differential pulse code modulation (ADPCM). As known by those of ordinary skill in art, ADPCM generally provides a 4× compression ratio and advantageously consumes only minimal computing resources. Thus, because this realization of the first example embodiment utilizes a low-compression encoder 238 for its back-up encoding needs, fewer processing resources or hardware must be dedicated to enable the low-compression encoder 238 as compared to the high-compression encoder 234. This advantageously reduces system complexity and reduces cost in comparison to the alternative of including two encoders capable of simultaneously performing high compression encoding on two incoming signals.

At step 536, the system continues to compress and store the incoming message in memory 240. At step 540, the system detects the end of the incoming call and stops recording. Consequently the memory manager 236 notes the memory address at which the message data ends to enable retrieval of the message from memory 240.

At step 544, the system queries the primary multiplexer 230 to determine if the primary call is complete. If the primary call is not complete, at step 548, the system enters a wait mode for a predetermined period of time, e.g., five seconds or some other desired period of time, and returns to step 540 to query the primary multiplexer 230 to determine if the high-compression encoder is finished with the other call. This process repeats until the encoding of the other call is complete.

When the primary call is complete, the method moves to step 552 of FIG. 7B, wherein a message download process begins. In particular, the memory manager 236 retrieves the signal encoded by the low-compression encoder 238 from memory and forwards it to the low compression decoder 250. The low compression decoder 250 reverses the effects of the low-compression encoder 238 thereby re-establishing the signal in an uncompressed format.

At step 556, the low compression decoder 250 transfers the decompressed message to the primary multiplexer 230, which is now free from its operation with the first incoming call. At step 560, the primary multiplexer 230 forwards the signal to the high-compression encoder 234, and at step 564, a memory address is allocated.

At step 568, the high-compression encoder 234 performs high ratio signal compression on the message to achieve a high rate of compression thereby further reducing the memory required f or storage of the message. In the example embodiment, a compression ratio of approximately 40 times an uncompressed version of the digital format of the incoming signal is achieved. At step 572, the process continues, and the output of the low rate high compression encoder 234 is stored in memory. This process continues until step 576, in which the end of the message is detected. Upon detection of the end of the message in step 576, the memory manager module 236 stores the memory address of the end of the message for future reference, as indicated by the loop back to step 564. This completes the re-encoding of the message, and in step 580, the system enters a stand-by mode.

Advantageously, the re-encoding process encodes the message at a compression rate ten times greater than that of the low-compression encoder. This in turn reduces the memory requirements of the answering devices. Reducing the required memory further reduces the cost of the answering device. Therefore, the design of this realization of the first example embodiment of the subject invention minimizes the required processor capability requirements by providing a low-computational, secondary encoder to encode a second call. This advantageously allows use of a less expensive processor.

Message Playback

To recall a message from memory for playback, a message recipient simply prompts the answering device to recall the message from the memory 240. The memory manager 236, based on the stored address, performs high-compression decoding on the signal prior to playback. Advantageously, the encoder and decoder are purposely selected to optimize the relation between the compression ratio and the processing requirements for each particular application without sacrificing audio quality.

Second Example Embodiment

Figure 8:
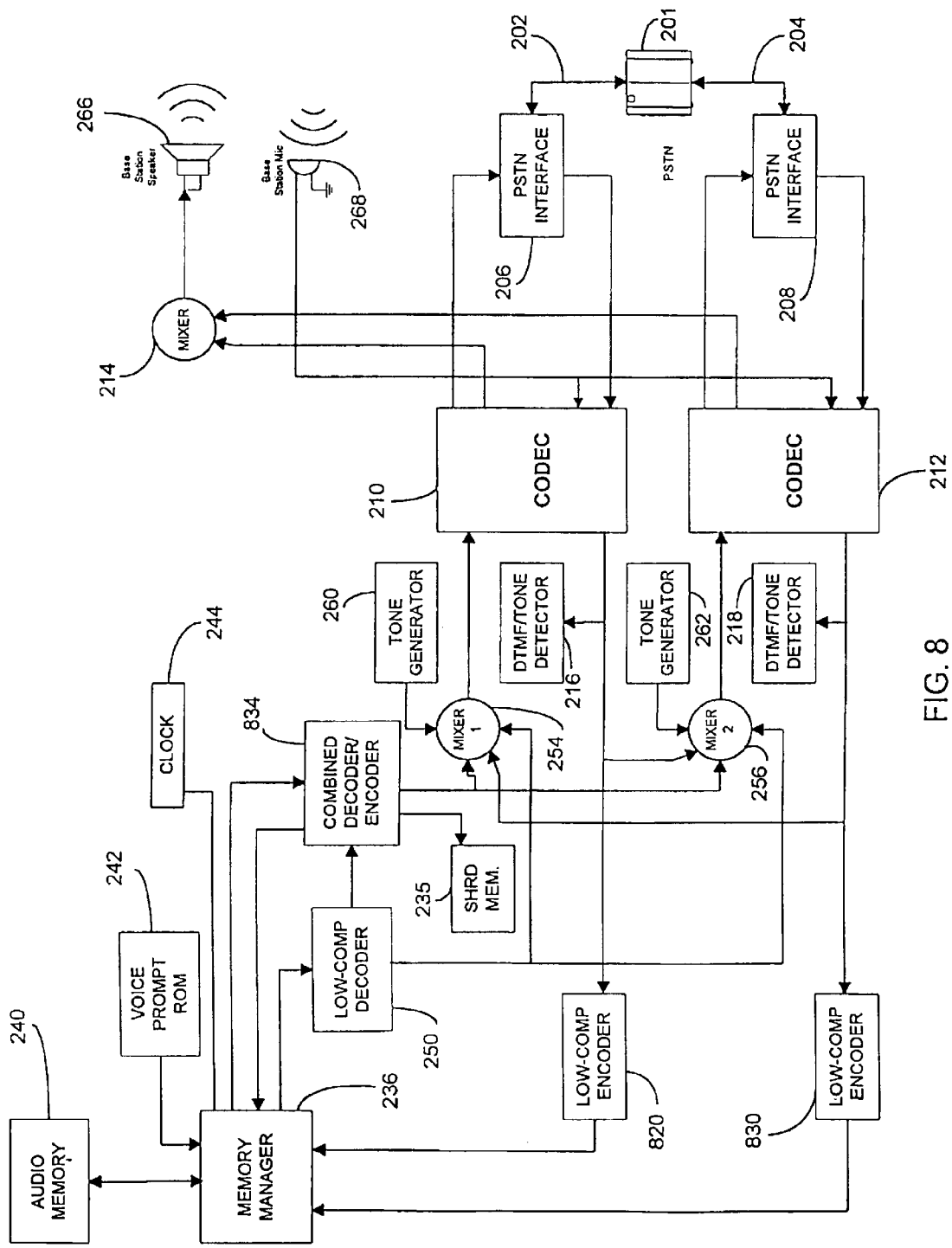
FIG. 8 illustrates a exemplary configuration of a second example embodiment of the subject invention.

A second example embodiment is shown in FIG. 8. The apparatus of the second example embodiment includes a different configuration that further reduces the computational requirements of the encoding apparatus. FIG. 8 shares commonality with FIG. 4 and like elements are referenced with like identifying numerals. For purposes of brevity, a description of previously described elements is avoided. The differences, however, are discussed below.

As shown, FIG. 8 defines one exemplary realization of a second example embodiment wherein a received signal is automatically subject to low-compression encoding and stored. In this manner, if two calls are concurrently received, both are subject to low-compression encoding and stored. When the system is idle, i.e. no incoming calls, the low-compressed signals are retrieved, decoded and subject to the high compression encoding by combined decoder/encoder 834. This desirably frees the combined decoder/encoder 834 to decode high-compressed signals during the signal retrieval process.

To achieve such operation, one realization of the second example embodiment connects the output of the line1 CODEC 210 directly to a low-compression encoder 820. The output of the line1 low-compression encoder 820 connects to the memory manager 236. Similarly, the output of the line2 CODEC 212 connects to a line2 low-compression encoder 830. The output of the line2 low-compression encoder 830 connects to the memory manager 236.

A combined encoder/decoder 834 capable of high-compression encoding replaces the combined decoder 252 (FIG. 4) of the first example embodiment. The combined encoder/decoder 834 receives input from the memory manager 236 and the low-compression decoder 250 and provides an output signal to the line1 mixer 254, the line2 mixer 256 and the memory manager 236. Additional interconnections between hardware are included as needed to facilitate operation. It is further contemplated that the combined decoder/encoder 834 be configured to run off-line in non-real time. Such a configuration further reduces the computing requirements of the combined decoder/encoder 834 as the process of encoding requires greater processor resources than the decoding process. Because fewer processor resources are necessary to perform an encoding operation in non-real time, the overall processing requirements of the combined decoder/encoder may advantageously be reduce without impinging on the performance of the decoding process.

Figure 9:
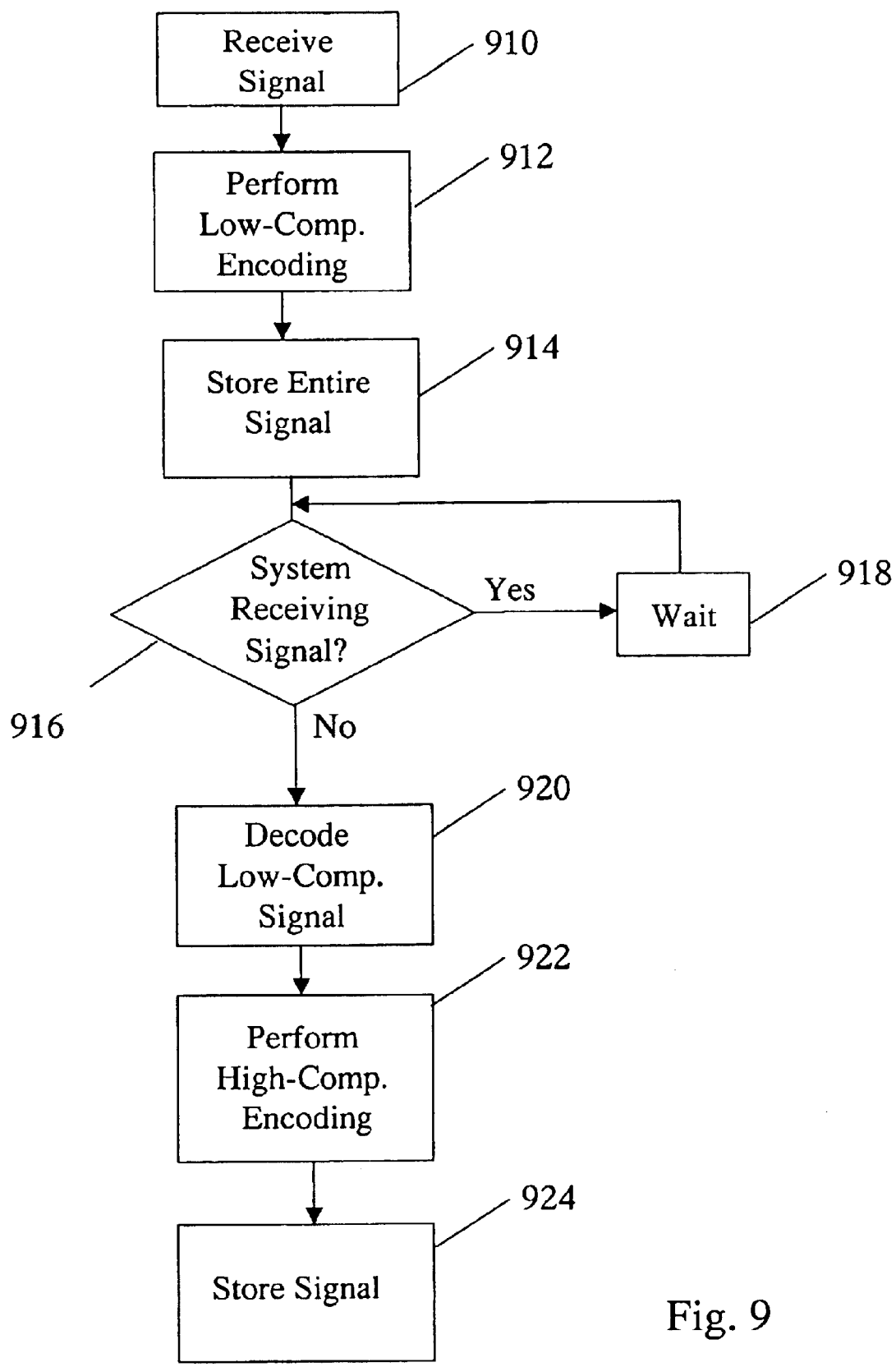
FIG. 9 illustrates a method in accordance with the second example embodiment.

The operation of the second example embodiment, shown in FIG. 8, is discussed in relation to FIG. 9. At step 910, the recording device receives a signal over either line1 202 or line2 204. The signal is forwarded, through either of CODECs 210, 212, to one of the low-compression encoders 820, 830, respectively, depending on the line from which the signal arrived. At step 912, the signal is low-compression encoded by one of the low-compression encoders 820, 830. At step 914, the memory manager 236 stores the low-compressed signal in memory 240. In this manner, the system may simultaneously encode and store two concurrently arriving signals.

At decision block 916, when the compression step indicated by step 912 is complete, the system queries if either of the low-compression encoders 820, 830 is busy, i.e., receiving a signal, to determine if adequate computing resources are available. If so, at step 918, the system enters a wait state, to await the completion of the receipt of the incoming signal.

Alternatively, if the query reveals the lack of an incoming signal, then the system progresses to step 920, in which the stored low-compressed signal is retrieved from memory and decoded. At step 922, the decoded signal undergoes high-compression encoding by the combined encoder/decoder 834. After high-compression encoding, at step 924, the signal is again stored in memory 240.

Like the first embodiment, the second example embodiment is advantageous since it requires only one processing means capable of performing high-compression encoding/decoding, in this case, combined decoder/encoder 834. The result is reduced cost, complexity and size of the recording device without sacrificing the capability to store two concurrently arriving signals. Another benefit is reduction in processor requirements given that neither of two concurrently received messages are encoded using a high-compression algorithm. Instead, as discussed, high-compression encoding of these messages is performed only when the processor is free of other processing demands.

Third Example Embodiment

Figure 10:
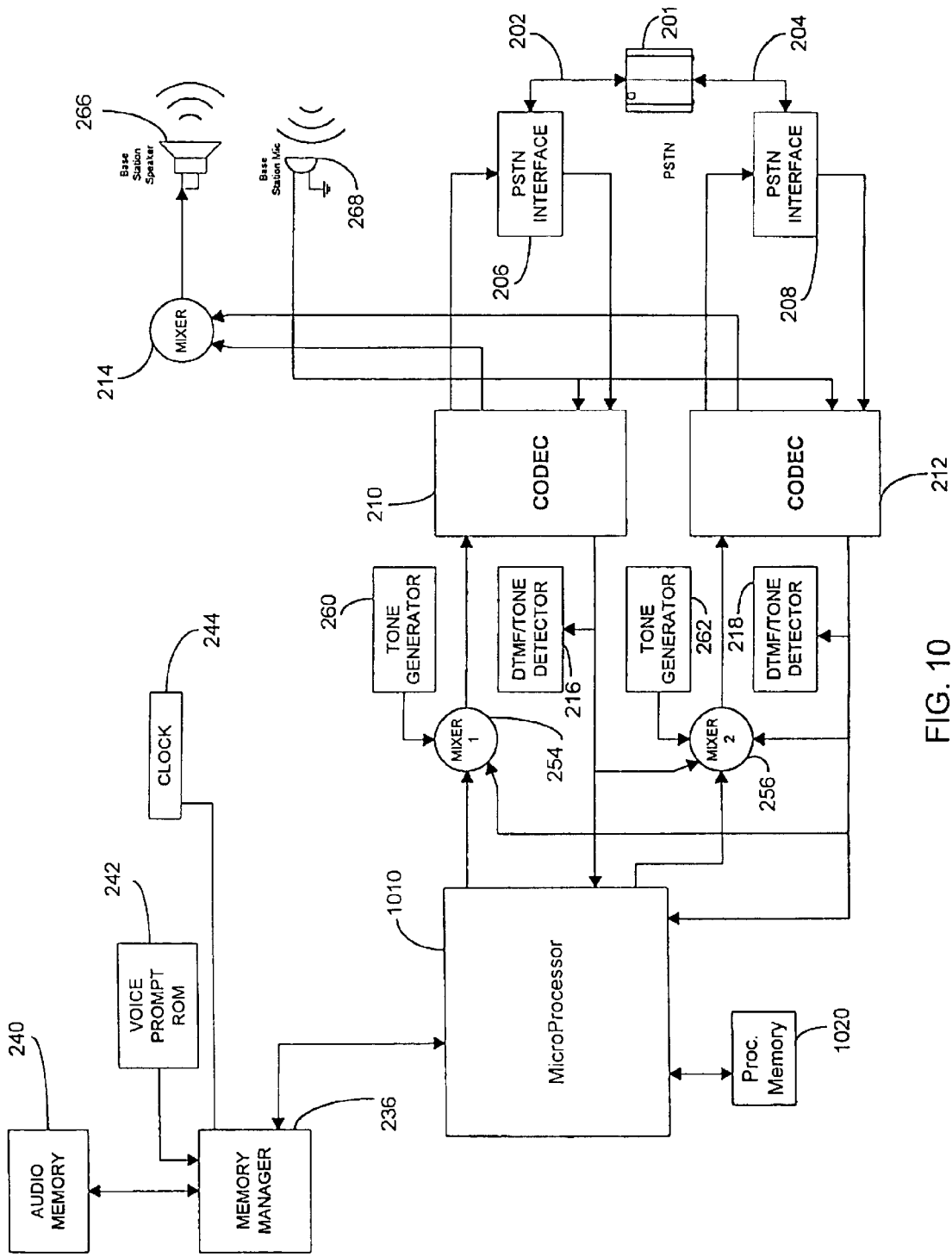
FIG. 10 illustrates a exemplary configuration of a third example embodiment of the subject invention.

FIG. 10 illustrates a third exemplary embodiment of the subject invention. This third example embodiment centralizes the compression and decompression operations in one or more general purpose microprocessors. In particular, the exemplary embodiment shown in FIG. 10 utilizes a single microprocessor 1010 to perform these tasks. This configuration variably selects between one or more compression algorithms based on the amount of available computational resources. FIG. 10 shares commonality with FIGS. 4 and 8 and like elements are referenced with like identifying numerals. For purposes of brevity, a description of previously described elements is avoided. The differences however are discussed below.

As shown, FIG. 10 defines one exemplary configuration of a third example embodiment wherein the received signal is automatically forwarded from either of the line1 CODEC 210 or the line2 CODEC 212 to the microprocessor 1010. The microprocessor 1010 connects through a suitable input/output interface to the memory manager 236 and through a separate suitable input/output interface to processor memory 1020. Outputs of the microprocessor connect to the line1 mixer 254 and the line2 mixer 256.

During receipt of a single incoming signal, the microprocessor selects between one or more available compression algorithms. The selection is made based on processor resources available at receipt of the incoming signal. For example, if adequate processing resources are available, the processor performs maximum compression. In one variation, the compression schemes are embodied in software and stored in the processor memory 1020.

During receipt of a second caller concurrently with the receipt of the first signal, the system evaluates microprocessor resources and selects a compression algorithm that will achieve maximum compression using the available microprocessor resources. The microprocessor performs compression on the second incoming signal using the selected compression algorithm and stores the signal in audio memory 240. The microprocessor 1010 then monitors the situation to determine when adequate processing resources are available to encode the stored signals using a high-compression algorithm. Upon detecting the availability of adequate processing resources, the microprocessor decodes the stored signal and re-encodes it using a high-compression algorithm. It is contemplated that adequate processing resources to perform high-compression encoding will be available when the recording device is receiving only one incoming signal. In one variation, the high-compression algorithm comprises an Enhanced Full Rate GSM Encoder and the low-compression algorithm comprises ADPCM.

In this manner, the microprocessor is selected to balance on one hand the reduced cost of memory which is saved by a high compression ratio and, on the other hand, the cost of a more complex microprocessor capable of achieving the high-compression ratios. Of course, the bit rate of the incoming signal is also important as it will in part determine the microprocessor 1010 requirements. In this manner, an ideal balance between microprocessor power and memory is reached.

To achieve signal playback, the microprocessor decodes the signal stored in memory and forwards the decoded signal to either one of the line1 mixer 254 or the line2 mixer 256. The playback operation of this third example embodiment of the recording device mirrors the operation of the realization of the first example embodiment of the recording device, and need not be explained further.

Fourth Example Embodiment

Figure 12:
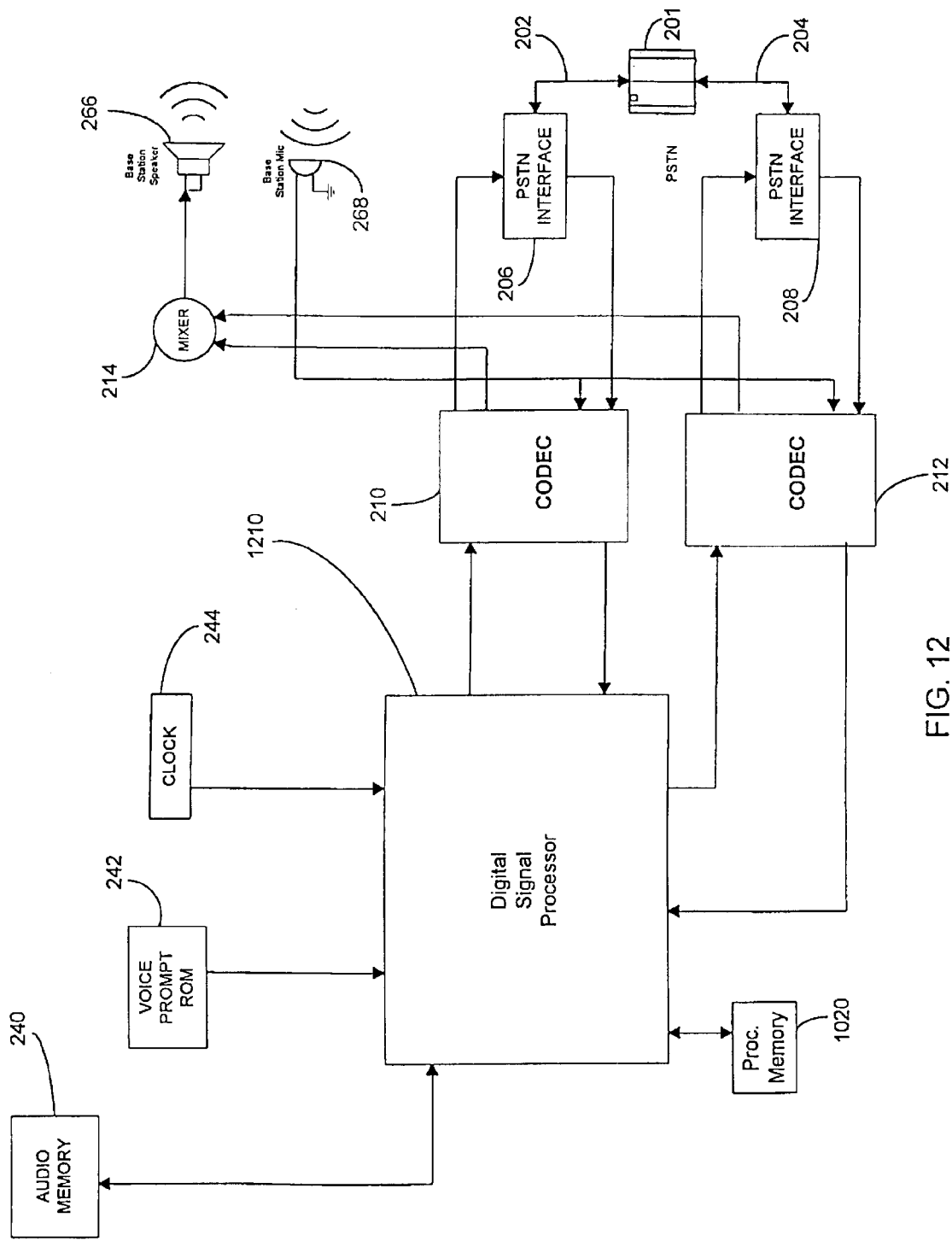
FIG. 12 illustrates a block diagram of a fourth example embodiment of the subject invention.

FIG. 12 illustrates a fourth example embodiment of the subject invention. As shown, the fourth example embodiment comprises an embodiment similar to third example embodiment. The fourth example embodiment differs from the third example embodiment in that several components of the answering device are incorporated into a digital signal processor (DSP) 1210. In particular, the DSP 1210 is configured to perform the functions as previously described of the tone generator 260 262, the DTMF/Tone detectors 216, 218, line1 mixer 254, line2 mixer 256, encoders, decoders, and memory manager 236. As known by those of ordinary skill in the art, DSPs are well suited for performing encoding and decoding of digital signals, signal routing and mixing and tone monitoring and generation. The operation of this fourth example embodiment generally mirrors the operation of the third example embodiment with the DSP 1210 performing the functions of the devices shown in FIG. 10 but missing from FIG. 12. It is contemplated that the DSP 1210 perform additional functions such as those described below in the section entitled Additional Features and Variations.

Fifth Example Embodiment

Figure 11:
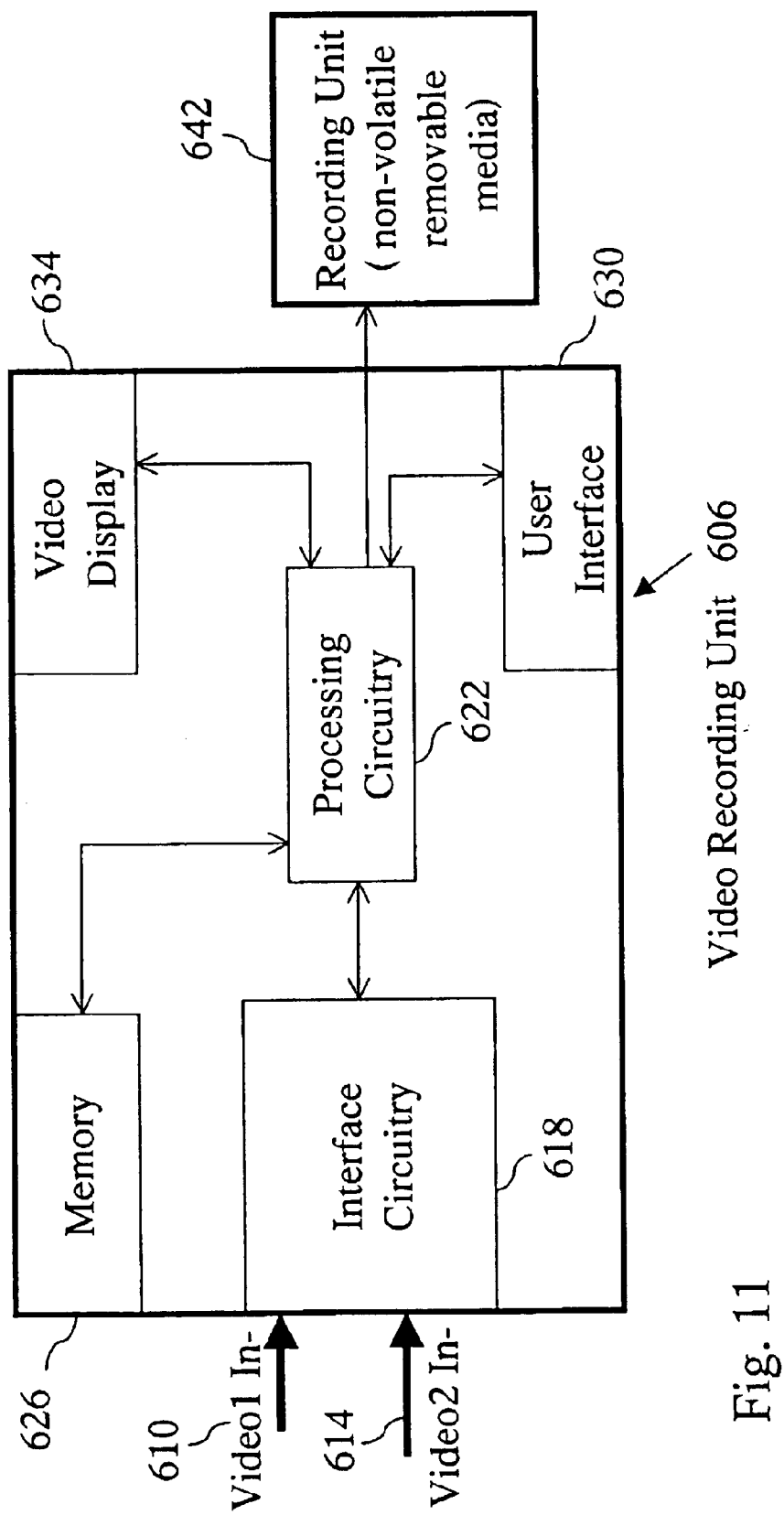
FIG. 11 illustrates a block diagram of a fifth example embodiment of the subject invention.

FIG. 11 illustrates a fifth example embodiment of the subject invention. As shown, the fifth example embodiment comprises a video recording device. The configuration of this embodiment provides for recordation of two concurrently arriving video feeds while minimizing memory and processing requirements. It is contemplated that the principles of this fifth example embodiment may extend to recording devices configured to record more than two video feeds.

With reference to FIG. 11, the video recording device comprises a video 1 line-in 610 and a video2 line-in 614, both of which connect to interface circuitry 618. In one embodiment, the interface circuitry 618 comprises means to convert the incoming signal into a digital format. The output of the interface circuitry 618 couples to processing circuitry 622. The processing circuitry connects to memory 626, a video display 634, user interface 630, and a recording unit 642. In one variation, the recording unit 642 comprises a video cassette recorder. In another variation, the recording unit 642 comprises an optical disc recording device. It is further contemplated that the fifth example embodiment may include means to process a signal comprising both video and audio information.

The video recording unit 606 operates in accordance with the above-described principles described in relation to the first, second and third example embodiments. In general, a first incoming video signal arrives over either of video1 line-in 610 or video2 line-in 614 to the interface circuitry 618. The interface circuitry 618 prepares the signal for processing by digitization and filtering and forwards it to the processing circuitry 622. Processing circuitry 622 chooses a compression algorithm depending on the computational resources available. In general, the more resources that are available, the greater the compression ratio of the algorithm that is selected. The processing circuitry 622 compresses the signal using the selected algorithm, and the compressed signal is then stored in memory. In one variation, the signal undergoes the maximum degree of compression that the processing circuitry 622 can achieve when the signal is the only feed to the video recording unit 606.

If a second signal arrives concurrently with the first arriving signal, the processing circuitry evaluates the available processing resources and performs the maximum degree of compression that is available. In one variation, if processing resources are unavailable with which to perform high-ratio compression, a lower-ratio compression is performed on the signal. When adequate processing resources are available, the video recording device 606 retrieves the second arriving signal from memory, decodes it and performs high-ratio compression on the signal. The signal, compressed at a maximum ratio, is again stored in memory.

In accordance with the foregoing, only one signal at a time is subjected to high compression encoding. As a result, processing circuitry complexity is minimized while memory 240 requirements are maintained or reduced.

Additional Features and Variations

Those of ordinary skill in the art should realize that the above described exemplary embodiments are but some of the various configurations that achieve the advantages of the subject invention, but that other configuration are available that are within the scope of the invention. For example, it is contemplated that in one variation, incoming signals would be stored in an uncompressed format in memory until the recording device is idle. When the recording device is idle, the signals are retrieved from memory and high-compression encoded to reduce memory requirements. In another variation, the first arriving signal is encoded, using either high-compression or low compression encoding, and the second arriving signal is stored in an uncompressed state. When no signals are being received, the unencoded signal(s) are retrieved and subjected to high-compression encoding. These are but some of the many possible variations which those of ordinary skill in the art may design.

It is further contemplated that all the above-described embodiments may optionally include various features enabled by the configuration of the subject invention. For example, one such feature comprises means to notify a message recipient during remote message retrieval that a call is being recorded on one of the other lines during the message retrieval. In the context of a telephone recording, if a message recipient is calling in on line1 from a remote location to retrieve their messages and a message is concurrently being recorded on line2, the recording device will notify the party calling on line1 of the concurrently incoming message.

Yet another option that is contemplated comprises means to provide the party calling on line1 the option to "break into the message" and speak directly with the party calling on line2.

Still another option which is contemplated comprises configuring the answering device to monitor on arrival of a call over either line, and upon receipt of the call, utilizing the other line to ring a pre-defined number, such as to notify the message recipient of the incoming message. It is further contemplated that these options can be combined with the previous option to provide the ability to break into the message to speak directly with the calling party. It is further contemplated that through the use of a caller ID or other number identification system, the recording device can be programmed to call the message recipient only upon receipt of a call from one or more particular numbers.

While embodiments and applications of the invention have been shown and described, it should be apparent to these of ordinary skill in the art that these examples are merely illustrative, and that many other embodiments are possible without departing form the spirit and scope of the subject invention. Accordingly, the invention is not to be restricted, except as by the appended claims in light of the doctrine of equivalents.

What is claimed is:

1. A multi-line telephone answering machine for recording incoming messages comprising:
    a first data port configured to receive messages;
    a second data port configured to receive messages;
    a first encoder configured to encode messages at a first rate of compression;
    a second encoder configured to encode messages at a second rate of compression less than said first rate;
    memory for storing messages encoded by either of said first encoder and said second encoder; and
    a controller configured, upon receipt of a message from either of said first and second data ports, to control said first encoder to encode said message and store it in said memory responsive to a condition in which the first encoder is idle, and to control said second encoder to encode said message and store it in said memory responsive to a condition in which the first encoder is busy.

2. The multi-line telephone answering machine of claim 1, further comprising a decoder, wherein said controller is further configured to control said decoder to decode a message encoded by said second encoder and to control said first encoder to re-encode said message responsive to a condition in which said first encoder is idle.

3. A recording device for recording two or more signals comprising:
    at least two data ports configured to receive signals;
    a switch having at least two inputs and at least two outputs, wherein at least one of said inputs is connected to one of said data ports, and another of said inputs is connected to another of said data ports;

a high-compression encoder coupled to one of said outputs of said switch;

at least one low-compression encoder coupled to one of said outputs of said switch; and memory coupled to said high compression encoder and said low-compression encoder and configured to store signals compressed by either of said encoders; and a controller configured to control said switch to selectively route an incoming signal to said high-compression encoder responsive to an idle condition of said high-compression encoder and to one of said low-compression encoders responsive to a busy condition of said high-compression encoder.

4. The recording device of claim 3, wherein said controller is configured to control said high-compression encoder to re-encode a message encoded by one of said low compression encoders responsive to an idle condition of said high compression encoder.

5. The recording device of claim 3 wherein said recording device comprises a telephone answering machine.

6. The recording device of claim 3, wherein at least a portion of said signal represents video information.

7. The recording device of claim 3, further including a decoder to de-compress a message encoded by one of said low-compression encoders.

8. The recording device of claim 3, wherein one of said low-compression encoders is configured to perform ADPCM coding.

9. A recording device configured to record two or more data streams comprising:

at least two data input lines for receiving the data streams; and a processor configured to receive the data streams arriving over said at least two data input lines, said processor configured to (1) select a first high-compression algorithm to compress a data stream responsive to a first available capacity condition, and a second lower-compression algorithm to compress the data stream responsive to an unavailable capacity condition; (2) compress the data stream using the selected algorithm; and (3) decode and re-encode a data stream encoded by said second algorithm responsive to a second available capacity condition.

10. The recording device of claim 9, further including memory to store a compressed data stream.

11. The device of claim 9, wherein said data streams comprises video data and audio data.

12. The device of claim 9, wherein said processor comprises one or more digital signal processors.

13. A method for recording two or more signals comprising:

receiving a first signal;

compressing said first signal using a first compression algorithm to create a first compressed signal;

storing said first compressed signal;

receiving a second signal during receipt of said first signal;

deferring compression of said second signal using said first compression algorithm;

processing said second signal to create a second processed signal;

storing-said second processed signal;

detecting completion of receipt of said first signal; and responsive to said detecting step, retrieving said second processed signal and performing compression on said signal using said first compression algorithm.

14. The method of claim 13, wherein said processing of said second signal comprises compressing said second signal using a second compression algorithm.

15. The method of claim 13, wherein said processing of said second signal comprises compressing said second signal at a compression ratio which is lower than that achieved by said first compression algorithm.

16. The method of claim 13, wherein said signal comprises a voice message.

17. A program storage device readable by a machine, embodying a program of instructions executable by the machine to perform method steps for recording at least two data inputs, said method comprising the steps of:

receiving a first signal;

compressing said first signal at a first compression ratio responsive to a first available resource condition;

as an alternative to the previous step, compressing said first signal at a second compression ratio lower than said first compression ratio responsive to an unavailable resource condition;

storing the compressed signal resulting from either of the previous compressing steps;

responsive to a second available resource condition, performing the following steps:

retrieving a signal compressed at said second compression ratio;

decoding said retrieved signal;

compressing said signal at said first compression ratio; and storing the compressed signal resulting from said previous step.

18. The device of claim 17, wherein said program storage device is embodied in a telephone answering device.

19. The device of claim 17, wherein an available resource condition is the condition in which an electronic microprocessor is available to compress a signal at said first compression ratio, and an unavailable resource condition is the condition in which an electronic microprocessor is unavailable to compress a signal at said first compression ratio.

20. A device for recording two or more signals comprising:

means for receiving a first signal;

means for compressing said first signal at a first compression ratio to create a first compressed signal;

means for storing said first compressed signal;

means for receiving a second signal;

means for compressing said second signal, in the event that said first compressing means is busy compressing said first signal, at a second compression ratio to create a second compressed signal, wherein the second compression ratio is less than the first compression ratio; and means for storing said second compressed signal.

21. The device of claim 20, further including:

means for detecting completion of receipt of said first signal; and means, responsive to said completion of receipt of said first signal, comprising:

means for de-compressing said second compressed signal to create a de-compressed second signal;

means for re-compressing said de-compressed second signal at said first compression ratio to create a re-compressed signal; and means for storing said re-compressed signal.

22. A method of receiving calls on a two or more line answering device comprising:

receiving a call over one of said two or more lines concurrent with a request from another line of said two or more lines for remote message retrieval by a message recipient; and alerting said message recipient during said concurrent request for remote message retrieval of concurrent said receipt of said call.

23. The method of claim 22, wherein said method further includes connecting said message recipient calling for remote message retrieval with said call.

24. The method of claim 22, further comprising:

screening said call to determine a source of said call.

* * * * *